US012145173B2

(12) United States Patent
Hill et al.

(10) Patent No.: US 12,145,173 B2
(45) Date of Patent: Nov. 19, 2024

(54) ULTRASONIC TRANSDUCER

(71) Applicant: Tribosonics Limited, Sheffield (GB)

(72) Inventors: Samuel Joseph Hill, Sheffield (GB); Philip Brian Harper, Sheffield (GB); Tapiwa Ropafadzo Mutasa, Sheffield (GB)

(73) Assignee: Tribosonics Limited, Sheffield (GB)

( * ) Notice: Subject to any disclaimer, the term of this patent is extended or adjusted under 35 U.S.C. 154(b) by 991 days.

(21) Appl. No.: 17/051,900

(22) PCT Filed: Apr. 30, 2019

(86) PCT No.: PCT/GB2019/051199
§ 371 (c)(1),
(2) Date: Oct. 30, 2020

(87) PCT Pub. No.: WO2019/211599
PCT Pub. Date: Nov. 7, 2019

(65) Prior Publication Data

US 2021/0237122 A1 Aug. 5, 2021

(30) Foreign Application Priority Data

May 1, 2018 (GB) ..................................... 1807177

(51) Int. Cl.
*B06B 1/06* (2006.01)

(52) U.S. Cl.
CPC .................................. *B06B 1/0685* (2013.01)

(58) Field of Classification Search
CPC ............................ B06B 1/0685; B06B 1/0681
See application file for complete search history.

(56) References Cited

U.S. PATENT DOCUMENTS 3,925,692 A 12/1975 Leschek et al.
3,935,484 A 1/1976 Leschek et al.
(Continued)

FOREIGN PATENT DOCUMENTS

KR 20100110227 A 3/2003
KR 20160129826 A 11/2016
(Continued)

OTHER PUBLICATIONS

Search & Examination Report for corresponding Application No. GB1807177.9, mailed on Oct. 17, 2018, 9 pages.
(Continued)

*Primary Examiner* — J. San Martin
(74) *Attorney, Agent, or Firm* — Dority & Manning, P.A.

(57) ABSTRACT

Disclosed is a piezoelectric transducer which is mounted to a target in use, comprising: a piezoelectric element having a front face which faces the target, and an opposing rear face which faces away from the target, wherein the piezoelectric element has a first acoustic impedance; an compression element located on the rear surface side of the piezoelectric element, the compression element having a second acoustic impedance which is less than the first acoustic impedance; and, a compression mechanism which urges the compression element towards the piezoelectric element such that the compression element is compressed between the compression mechanism and piezoelectric element.

22 Claims, 2 Drawing Sheets

(56) References Cited

U.S. PATENT DOCUMENTS

| | | | | |
|---|---|---|---|---|
| 4,282,453 | A * | 8/1981 | Knight | G01S 5/22 310/334 |
| 4,430,593 | A | 2/1984 | Gohlert et al. | |
| 4,556,814 | A * | 12/1985 | Ito | G10K 11/002 73/644 |
| 4,601,210 | A * | 7/1986 | Brown | G01F 1/66 73/861.27 |
| 5,038,067 | A | 8/1991 | Tabin | |
| 2003/0042661 | A1 | 3/2003 | Popjoy | |
| 2003/0101007 | A1 | 5/2003 | Dubois et al. | |
| 2010/0006624 | A1 | 1/2010 | Nakatsuka et al. | |
| 2013/0205904 | A1* | 8/2013 | Ueberschlag | G01F 1/667 73/644 |
| 2015/0115773 | A1 | 4/2015 | Li et al. | |
| 2020/0086347 | A1* | 3/2020 | Hirao | B06B 1/064 |
| 2020/0171544 | A1* | 6/2020 | Chwalek | B06B 1/0662 |

FOREIGN PATENT DOCUMENTS

| | | |
|---|---|---|
| RU | 2 582 889 | 4/2016 |
| SU | 1000119 | 2/1983 |
| WO | WO 2018/010015 | 1/2018 |
| WO | WO 2018/068147 | 4/2018 |

OTHER PUBLICATIONS

International Search Report & Written Opinion for corresponding PCT Application No. PCT/GB2019/051199, mailed on Aug. 23, 2019—10 pages.

PCT International Preliminary Report on Patentability for corresponding PCT Application No. PCT/GB2019/051199, mailed on Nov. 12, 2020, 8 pages.

Korean Office Action for corresponding Application No. 10-2020-7034473, dated Apr. 4, 2024, 9 pages.

* cited by examiner

ULTRASONIC TRANSDUCER

CROSS-REFERENCE TO RELATED APPLICATIONS

This application is a national phase application of International Application No. PCT/GB2019/051199, filed Apr. 30, 2019, which, in turn, is based upon and claims the right of priority to GB Patent Application No. 1807177.9, filed May 1, 2018, the disclosures of both of which are hereby incorporated by reference herein in their entirety for all purposes.

FIELD OF INVENTION

The invention relates to a piezoelectric ultrasonic transducer which includes a low acoustic impedance compression element to help mechanically damp signals issued from a piezoelectric element.

BACKGROUND

Ultrasonic transducers find broad application through various state of the art industries and fall into three general categories: transmitters, receivers and transceivers. Ultrasonic transducers can be used to evaluate targets to determine one or more properties of the target which modify the ultrasonic soundwaves. Thus, a target can receive ultrasonic soundwaves and the reflected waves be interpreted to provide an insight into the characteristics of the target. In industrial settings, ultrasonic transducers can be used to assess physical properties of targets such as composition, dimensions, density and temperature. Ultrasonic technology, and thus transducers, can also be used to determine the position of an object.

Ultrasonic transducers are commonly realised using piezoelectric technology in which a piezoelectric element can be used as a transmitter, receiver or transceiver. In a transmitter, the piezoelectric element is placed local to the target and electrically excited such that ultrasonic waves can pass from the transducer into the target. In a receiver, ultrasonic waves are received by the piezoelectric element which converts the returning wave into an electrical signal which can be analysed using suitable techniques. A transceiver both transmits and receives the ultrasonic waves.

Typically ultrasonic transducers are designed with acoustic damping which typically provides an efficient transfer of sound into an absorbing material on the back of the piezoelectric element. Transducers may also include electrical matching and damping within the system such as an RLC circuit in order to tune the ultrasonic response.

In order to achieve good acoustic damping the acoustic absorber generally have relatively high acoustic impedance which is typically the same as or closely matched to that of the piezoelectric material. This allows for efficient acoustic coupling between the piezoelectric element and the acoustic absorber which helps transfer the ultrasonic wave which issues from the rear surface of piezo electric element. The ultrasonic wave, once it is transferred into the acoustic absorber, is attenuated normally through scattering, absorption and geometric deflection of the waves.

Hence, conventional acoustic absorbers used in ultrasonic transducers are generally designed to scatter the energy and often comprise a composite incorporating two or more materials. Thus, an acoustic material may be a mixture of a heavy metal to achieve a high acoustic impedance, such as tungsten or copper, within a castable ceramic and or glass, for example.

The use of composite materials can lead to complex design issues in the acoustic absorbers, particularly in high temperature environments.

The present invention seeks to provide a transducer with an alternative acoustic absorber.

SUMMARY

The present invention provides a piezoelectric transducer according to the appended claims.

Described below is a piezoelectric transducer which may be mounted to a target in use. The transducer may comprise: a piezoelectric element having a front face which faces the target, and an opposing rear face which faces away from the target. The piezoelectric element may have a first acoustic impedance. A compression element may be located on the rear surface side of the piezoelectric element. The compression element may have a second acoustic impedance which is less than the first acoustic impedance. A compression mechanism may be arranged to urge the compression element towards the piezoelectric element such that the compression element is compressed between the compression mechanism and piezoelectric element.

Providing a piezoelectric transducer with a compression element which has a lower acoustic impedance and which is compressed can simplify the design of the compression element. It can further reduce the thermally induced stresses within the transducer when operating the device at higher temperatures.

Further disclosed is a piezoelectric transducer which may be mounted to a target in use and comprise: a piezoelectric element having a front face which faces the target, and an opposing rear face which faces away from the target; and, an compression element located on the rear surface side of the piezoelectric element. The compression element may have an acoustic impedance which is less than 20 Mrayls.

It will be understood that the term compression used herein relates to the exertion of a compressive force, rather than a physical compression of the compression element which reduces the dimensions of the component, although physical compression may occur with some materials. The compression element may comprise a substantially incompressible material. The compression element may comprise a substantially compressible material, for example, may be made from a compressible powder or a material that deforms under high load (e.g. a mesh or matrix). In this case, the acoustic impedance of the compression element is controlled by the load applied to the transducer which will vary the density. Also, the acoustic absorbing and scattering performance will be related to the load applied.

The second acoustic impedance may be less than 20 Mrayls. The second acoustic impedance may be greater than 1 Mrayls. The second acoustic impedance may be between 1 and 15 Mrayls. The acoustic impedance range may have an upper limit of 12.5 Mrayls. The upper limit may be 10 Mrayls. The lower limit of the acoustic impedance may be 2 Mrayls, or 5 Mrayls. The second acoustic impedance may be lower than 5.5 Mrayls. The acoustic impedance may be between 1 and 4.5 Mrayls. The acoustic impedance may be lower than 4.5 Mrayls. The second acoustic impedance may be lower than 3.5 Mrayls.

The compression element may include a contacting surface which faces the piezoelectric element and a loaded surface which engages with the compression mechanism.

The loaded surface may face away from the piezoelectric element. Although the examples described herein provide the compression mechanism to a rearward side of the compression element, there may be examples in which the compression is provided on more than one side of the compression element, or applied laterally to the compression element. The compression element may comprise a ceramic. The ceramic may be a castable ceramic or a ceramic cement. The ceramic may comprise one or more of a zirconia; alkali fluorosilicates; calcium silicates and aluminium silicates. The ceramic may be porous to improve the ultrasonic opacity. The compression element may comprise a refractory cement.

A piezoelectric transducer may further comprise a load transmitter through which load is transmitted from the compression mechanism to the compression element.

The load transmitter may be part of the compression mechanism so as to be attached thereto and/or form an integral part thereof. Alternatively, the load transmitter may be part of the transducer. The load transmitter may only contact the compression mechanism during assembly of the system or use thereof.

The load transmitter may include a rearward outer surface comprising a rounded surface for engaging with the compression mechanism.

The transducer may further comprise a housing in which the piezoelectric element and compression element are at least partially housed. The housing may receive a proximal end of the load transmitter. The load transmitter may be slidably received within the housing.

The compression mechanism may comprise a clamp which is attached to the target and arranged to clamp the transducer to the target via the compression element and piezoelectric element.

The compression mechanism may clamp the transducer to the target. The clamp may urge the compression element into the piezoelectric element so as to provide intimate contact therebetween. The compression mechanism may be attached to or be part of the target. The attachment may be provided by an extension to the target. The extension may be, for example, a bracket or other structure to which the clamping mechanism may be attached. The clamp may be a band clamp. The band clamp may encircle at least part of the target.

The compression mechanism may comprise a resilient bias which urges the compression element forwards. The compression mechanism may be arranged to compress the compression element and piezoelectric element against the target. Where the transducer includes a cover plate, the compression mechanism may compress the compression element and piezoelectric element against the cover plate.

The resilient bias may be a spring element which extends across a rear surface of the housing and contacts the load transmitter or compression element.

The resilient bias may be attached to the housing. The resilient bias may be a diaphragm. The resilient bias may provide a cap for the housing.

The compression mechanism may apply a force of at least 0.5 kN to the compression element. The compression mechanism may apply a force of at least 1 kN to the compression element. The force applied by the compression mechanism may be greater than 0.5 kN. The force may be greater than 1 kN. The upper range of the force may be less than 2 kN. The pressure applied by the compression mechanism may be between 2.5 MPa and 500 MPa. In many examples, the pressure will be between 20 MPa and 30 MPa or between 10 MPa and 40 MPa.

The compression mechanism may be temperature responsive such that the compressive force remains within a predetermined tolerance independently of temperature.

The piezoelectric transducer may further comprise the target, or be part of a system which includes the target. The system may be an ultrasonic detection system.

The target may have a rounded surface to which the transducer is mounted. The target may be a pipe. The target may have a temperature of greater than 200 degrees.

The compression element and piezoelectric element may be held together by the compressive force of the compression mechanism. The compression element and piezoelectric element may be freely coupled (stacked) together such that they are separable with the removal of the compressive force. That is, they are held together by the compressive force only and are not adhered or permanently affixed together in any other way.

The compression element may be a two part structure. The compression element may comprise a first part and a second part. The first part may be located within the second part. The first part may be a sleeve. The sleeve may locate the second part within the housing and in alignment with the piezoelectric element. The first and second part may be made from the same material.

The contacting surface of the compression element is in electrical communication with the rear face of the piezoelectric element.

The contacting surface of the compression element may include an electrical contact which is flush with the contacting surface and provides the electrical communication with the rear face of the piezoelectric element.

The compression element may include an electrical connection which extends from the contacting surface of the compression element to an interface connection which is rearwards of the piezoelectric element.

The piezoelectric transducer may further comprise one or more intermediate layers between the piezoelectric and target.

The intermediate layer may be a cover plate (shim). The intermediate layer may be a conductive material. The conductive material may comprise a metallic foil or a conductive paste or paint. The paste or paint may include a plurality of different conductive particles held within a binder. The binder may comprise between 12% and 8% by weight. The conductive particles may comprise one or more malleable metal. The conductive particles may be silver, copper or gold for example. Silver may comprise 50% of the paste or paint by weight. In some examples, the intermediate layer may not be conductive. In particular, the intermediate layer or layers which contact the target may be conductive or non-conductive. The paste may include particles of one or more of silver, copper, each of which may be incorporated 15-50% by weight, or tin 1-5% by weight. The binder may include boric acid and/or a mineral oil 1-5% by weight. Other materials and compositions may be possible.

An intermediate layer may be provided between the compression element and piezoelectric material; the piezoelectric material and a cover plate; the piezoelectric material and the target; and, the cover plate and the target. The cover plate may act as a quarter wave plate. The cover plate may have a thickness which is a quarter of the thickness of the wavelength of the ultrasonic waves used by the device. The cover plate may act as an anti-reflection layer.

The intermediate layer may be a cover plate which is attached to the housing. The intermediate layer may be a metallic foil arranged to conform to the surface of the target. The intermediate layers may comprise a malleable metal, such as copper, gold, or silver. Any of the intermediate layers may be foils (e.g. a thin sheet (for example 100 microns thick)) or a paste or paint.

The intermediate layer may include deformable surface protrusions which conform to the surface of the target when urged into the target. The compression element and piezoelectric element may be held together only by the compressive force applied by the compression mechanism. The compressive force may be necessary for the transducer to operate.

Also disclosed is a system comprising: a target; the piezoelectric transducer of any preceding claim; and, signal processing equipment arranged to receive and analyse an electrical signal produced by the piezoelectric transducer. The system may include the transducer and the target; or the transducer, the target and a detachable compression mechanism, such as a clamp. The transducer may be provided as a kit of parts. The kit of parts may include a detachable compression mechanism.

Further disclosed is a method of manufacturing a transducer which is mounted to a target in use and comprising: a piezoelectric element having a front face which faces the target, and an opposing rear face which faces away from the target; an compression element located on the rear surface side of the piezoelectric element; an contacting electrode and a compression mechanism which urges the compression element towards the piezoelectric element; the method comprising: locating the compression element and piezoelectric element in a stacked configuration; placing the stacked compression element and piezoelectric element against the target; applying a compressive load to the compression element.

The method may further comprise providing a housing in which the compression element and piezoelectric element are located to which the compression mechanism is attached and further comprising the steps of: priming the compression mechanism when i) loading the compression element and piezoelectric element into the housing, or ii) attaching the housing to the target.

A method is disclosed in which a compression element is formed using a castable material. The compression element may be cast with an electrode local to a contacting surface. After the compression element has been cast, the contacting surface may be machined to reveal the electrode. The contacting surface may be machined to provide a planar contacting surface having the electrode mounted flush therein.

The skilled person will appreciate that except where mutually exclusive, a feature described in relation to any one of the aspects described herein may be applied mutatis mutandis to any other aspect or example. Furthermore except where mutually exclusive any feature described herein may be applied to any aspect and/or combined with any other feature described herein.

BRIEF OVERVIEW OF FIGURES

The invention will now be described, by way of example only, with reference to the accompanying drawings, in which.

DETAILED DESCRIPTION

Throughout the specification, the terms proximal and distal are to be taken relative to the target. Similarly, forward, front, rearward and rear are to be taken with reference to the target such that a forward facing surface is one which faces the target.

Figure 1:
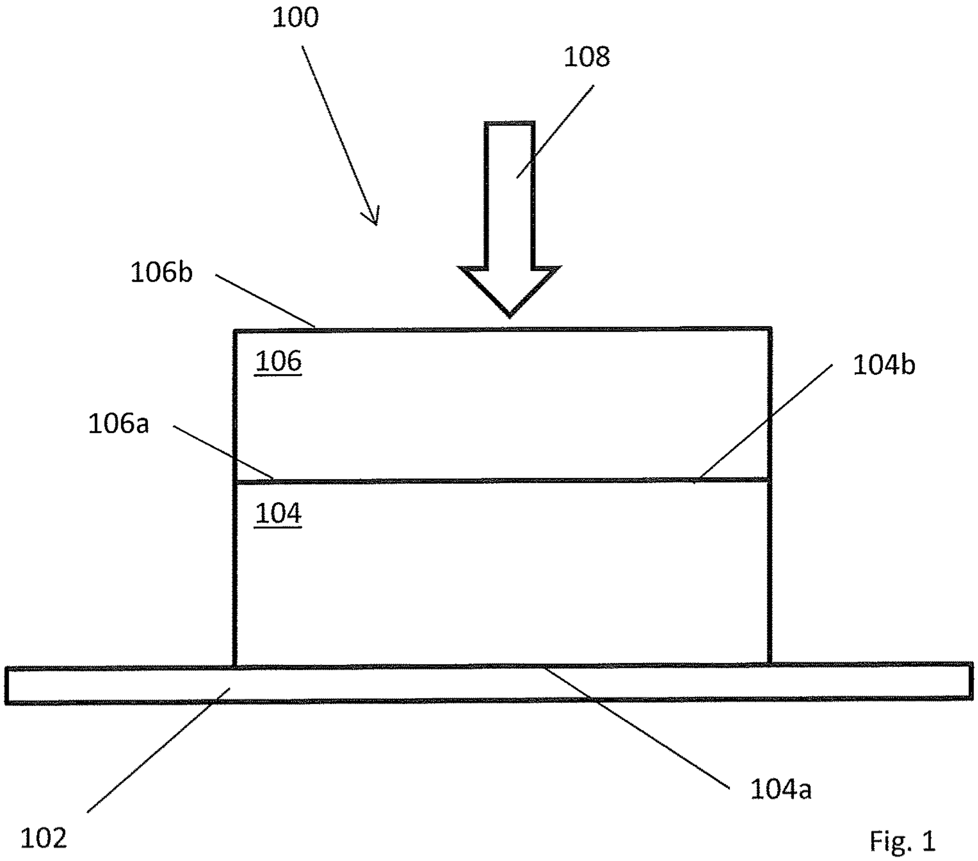
FIG. 1 is a schematic view of a first transducer.

FIG. 1 shows a piezoelectric transducer 100 which is mounted to a target 102 (which is also known as a device under test, DUT). The piezoelectric transducer 100 may comprise: a piezoelectric element 104 having a front face 104*a* which faces the target 102, and an opposing rear face 104*b* which faces away from the target 102. A compression element 106 may be located on the rear surface side of the piezoelectric element 104.

A compression mechanism (not shown) may apply a load 108 to the compression element 106 so as to urge the compression element 106 towards the piezoelectric element 104 such that the compression element 106 is compressed against the piezoelectric element 104.

Conventionally the bandwidth of the transducer is controlled by the damping on the back surface of the piezoelectric element. Because backing material has to have highly efficient transfer of acoustic energy from the piezoelectric element it has to dissipate this energy in order that it does not cause problems with the ultrasonic signals. Thus, backing materials are typically composite materials having particles to scatter the ultrasonic waves, and polymers to absorb them.

Disclosed herein is backing element in the form of a compression element which controls the bandwidth of the transducer by mechanical damping of the piezoelectric element. The compression element may be one which maximises the transmission of the load into the piezoelectric element but minimises the transmission of the acoustic energy from the piezoelectric material rearwards into the compression element. In this sense the compression element may be more accurately described as a mechanical control rather than an acoustic absorber.

One way of applying load in one direction but reducing transfer of energy from the piezoelectric element is to use a low acoustic impedance material. Ideally, the compression element will have as low an acoustic impedance as practically possible, however there will inevitably be some transfer and some scattering/absorbing as the ultrasound that enters into it.

Thus, it is considered that the compression may be of such a level that it mechanically damps the frequency response of the piezoelectric element. In order to efficiently mechanically damp the piezoelectric element a highly acoustically inefficient force transmitter is used. The small amount of parasitic noise that emanates rearwards from the piezoelectric element 104 or target 102 that enters the force transmitter is absorbed.

The piezoelectric element 104 and the compression element 106 may be assembled in a stack. The stack may be held together by mechanical compression or adhered to one another prior to the compression being applied. The adhesive may be any known adhesive which closely couples the constituent parts together and allows suitable transmission of the sound/pressure waves between the different elements. Alternatively, the components can be dry clamped together by the compressive force of the compression mechanism without the need for adhesives or other means of attachment. This may be useful in high temperature applications where adhesives suffer from thermally related degradation.

The piezoelectric material 104 may have a first acoustic impedance. The compression element 106 may have a second acoustic impedance which is less than the first acoustic impedance. The compression element 106 may additionally or alternatively, have a low acoustic impedance.

The low acoustic impedance may be less than, for example, 20 Mrayls. In some examples, the acoustic impedance of the compression element may be greater than 1 Mrayls. In other examples, it may be less than 15 Mrayls, 12.5 Mrayls or 10 Mrayls.

The piezoelectric element 104 may comprise conventional piezoelectric material such as Lead Zirconate Titanate (PZT), Lead Titanate (PT) or Lead Metaniobate (PbNb2O6), amongst others. The piezoelectric material may be greater than 20 Mrayls although this is not a strict requirement and lower acoustic impedance materials may be used.

The target 102 may be any object or device which is to be analysed or assessed using the ultrasonic transducer. In one example, the target may be an enclosure. The enclosure may comprise an exterior outer wall to which the transducer can be attached. The wall may have a wall thickness and comprise one or more materials. The enclosure may be a pipe or conduit. The target may have a planar surface against which the transducer is mounted or a curved surface. As is known in the art, the ultrasonic transducer could be used to determine multiple properties, or changes in properties, about the target including, for example, the wall thickness, composition, geometry, stress, temperature, lubricant film thickness, fluid properties, gap thickness, contact pressure, contact area, defect location, defect orientation, defect size, defect geometry any of the aforementioned measurements in or on a material or component on the other side of the target relative to the transducer.

Thus, the invention relates to a transducer which may be an ultrasonic transducer, for measuring ultrasonic waves produced by or incident on a piezoelectric or other similar material. The waves may be pulses or continuous signals. A pressure signal, such as for example an ultrasonic signal, may be produced by the transducer and sent into a sample to be measured. The transducer may sense and detect a reflected signal, from the sample to be measured. The measured reflected pressure signal may be used to analyse and determine one or more properties of the sample to be measured.

The compression element 106 may include a contact surface 106*a* which faces the piezoelectric element 104 and a loaded surface 106*b* which engages with the compression mechanism. The loaded surface 106*b* may face away from the piezoelectric element. When assembled, the compression element 106, piezoelectric element 104 and target 102 are arranged in a linear stack (a vertical stack as shown) which is compressed together to provide intimate and close coupling of the individual parts. It will be appreciated that the stack may have one or more intermediate layers, as described below, and direct contact between the parts is not an essential requirement.

Figure 2:
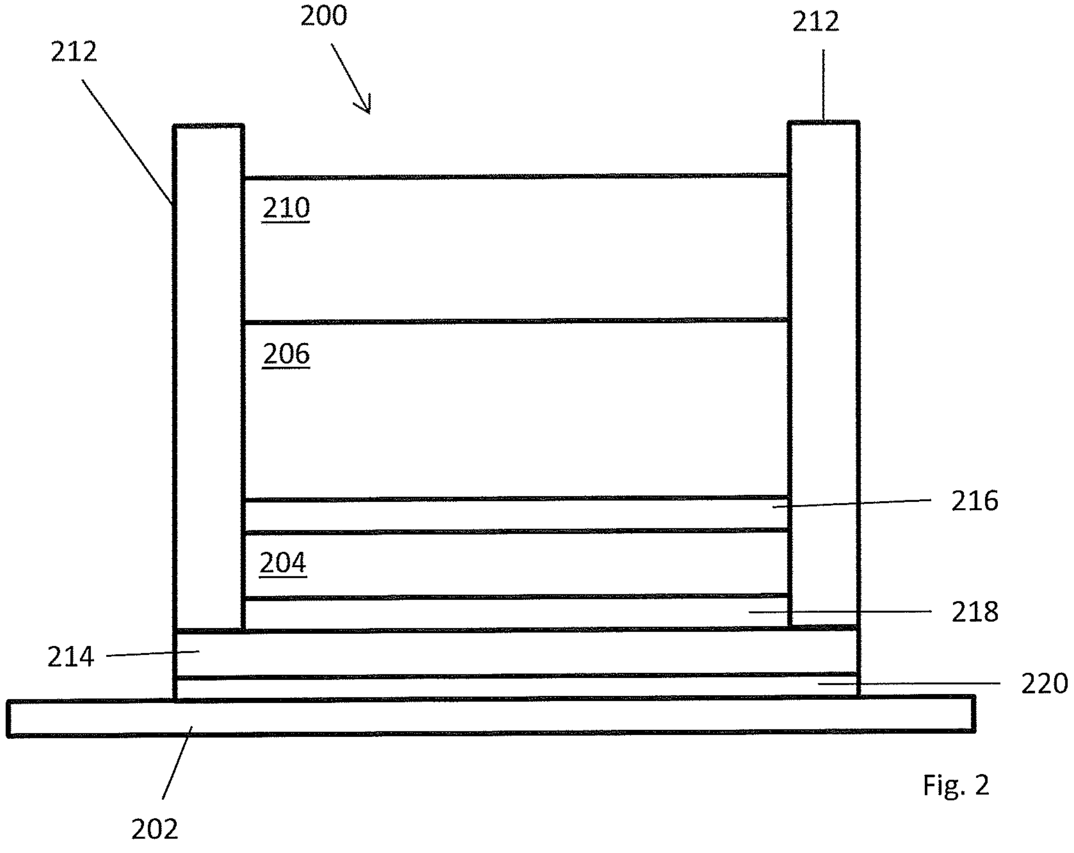
FIG. 2 is a schematic view of a second transducer.

FIG. 2 shows a schematic overview of a transducer 200 similar to the example shown in FIG. 1, where common elements have the same reference numerals incremented by 100. The transducer comprises: a piezoelectric element 204, an compression element 206, and a load transmitter 210. The piezoelectric element 204, the compression element 206, and load transmitter 210 form part of a stack which is retained within a housing 212. The compression element 206, piezoelectric element 204 and target 202 can be assumed to be similar to those described in relation to FIG. 1. It will be appreciated that the load transmitter is optional and the load may be applied directly to the compression element.

The piezoelectric element 206 may be a thin sheet having a very low aspect ratio. The thickness of the piezoelectric element will typically be between 0.1 mm to 10 mm. The piezoelectric element will typically be a circular disc with a diameter of 5 to 15 mm, but may possibly be 1 to 50 mm. It may also have other shapes such as square, an annulus, or multi-faceted.

The compression element 206 will typically have a contacting surface which has a shape and size to match that of the rear face of the piezoelectric element 204 to provide an even distribution of the compressive force. Thus, for example, where the piezoelectric element 204 is circular having a diameter, the contacting surface of the compression element 206 will have likewise.

The housing 212 is provided by body having an internal cavity into which the constituent parts of the transducer can be located. The body of the housing principally comprises a wall which defines the exterior of the housing and the transducer generally. The interior surface of the wall provides the cavity in which the compression element 206, piezoelectric element 204 and load transmitter 210 may be located. The housing shown in FIG. 2 is provided by a hollow tube having open ends into which the internal components can be loaded. It will be appreciated from the following description that the housing may have a closed end and either or both of the ends may be closed with a separate component such as a cover plate or the compression mechanism.

The compression element 206 and piezoelectric element 204 are sized so as to be snugly received within the housing cavity. As shown and mentioned above, the load transmitter 210 can be sized to match the footprint area of the compression element 206 so as to spread the compressive load fully and evenly across the surface of the compression element 206. Providing a snug fit within the housing restricts relative lateral movement between the parts during assembly and use of the transducer 200.

In the example of FIG. 2, a cover plate 214, also referred to as a shim, is placed at the proximal end (i.e. target end) of the housing 210 and adjacent to the front face of piezoelectric element 204. The cover plate 214 may be welded to the front of housing 214, or may be mechanically clamped or otherwise attached to the front of the housing 214. The cover plate 214 is shown as extending beyond the periphery of the piezoelectric element 204 and interior cavity of the housing 212 so as to overlap with proximal end face of the housing wall. However, this need not be the case and the cover plate 214 could be provided within the internal cavity of the housing 212.

Thus, there may be provided a transducer 200 comprising: an compression element 206 and piezoelectric element 204 which are held within a housing 210 in a stacked configuration having a proximal end adjacent to a target 202 which is to be interrogated and a distal end against which a load is applied via a load transmitter 210. The load transmitter 210 may provide a compressive force, typically as part of or from a compression mechanism, to the compression element 206 and piezoelectric stack 204 so as to press them into the cover plate 214 and/or target 202 located at or towards the proximal end of the transducer 200.

The transducer 200 may incorporate one or more intermediate layers. The intermediate layers may be located between any or all of the compression element 206, piezoelectric element 204, cover plate 214, target 202 or load transmitter 210 (to the extent that each one is present in a particular transducer). The intermediate layers may improve the contact between the respective components and may, where applicable, increase the acoustic coupling.

Thus, as shown in FIG. 2, there is shown a first intermediate layer 216 which separates the piezoelectric element 204 and the compression element 206. A second intermediate layer 218 is located between the piezoelectric element 204 and the cover plate 214. A third intermediate layer 220 is located between the transducer and the target. As shown, in the example of FIG. 2, this may be provided by an intermediate layer being between the cover plate and target. This layer may be conductive or non-conductive and may be a paste or paint.

As described above, the intermediate layers are provided to enhance the performance of the transducer and may comprise any suitable material and dimensions accordingly. In one example, the intermediate layers are provided by thin metal sheets. The sheets may be foils sheets or a conductive paste or paint which has been applied and compressed into a thin layer and optionally dried or cured. The sheets may be metallic and consist of one or more metals taken from the group including gold, silver, copper, platinum, nickel, tin, aluminium, alloys thereof.

The intermediate layers may be profiled on the interfacing surfaces. The profiling may include a plurality of surface features which deform and conform to an abutting surface when the transducer 200 is assembled and/or a compressive load is applied by the compression mechanism. The surface features may include one or more of a depression or protrusion. There may be a plurality of depressions or protrusions which may be provided on the interfacing surfaces in a regular or irregular array. Alternatively or additionally, the surface features may be provided by a general roughening of the surface using an appropriate process. The surface features will be determined by the particular requirements of the transducer and target to which it is mounted but many techniques for making surface features are known in the art, including machining, ablation, pressing/stamping, etching, etc.

Figure 3:
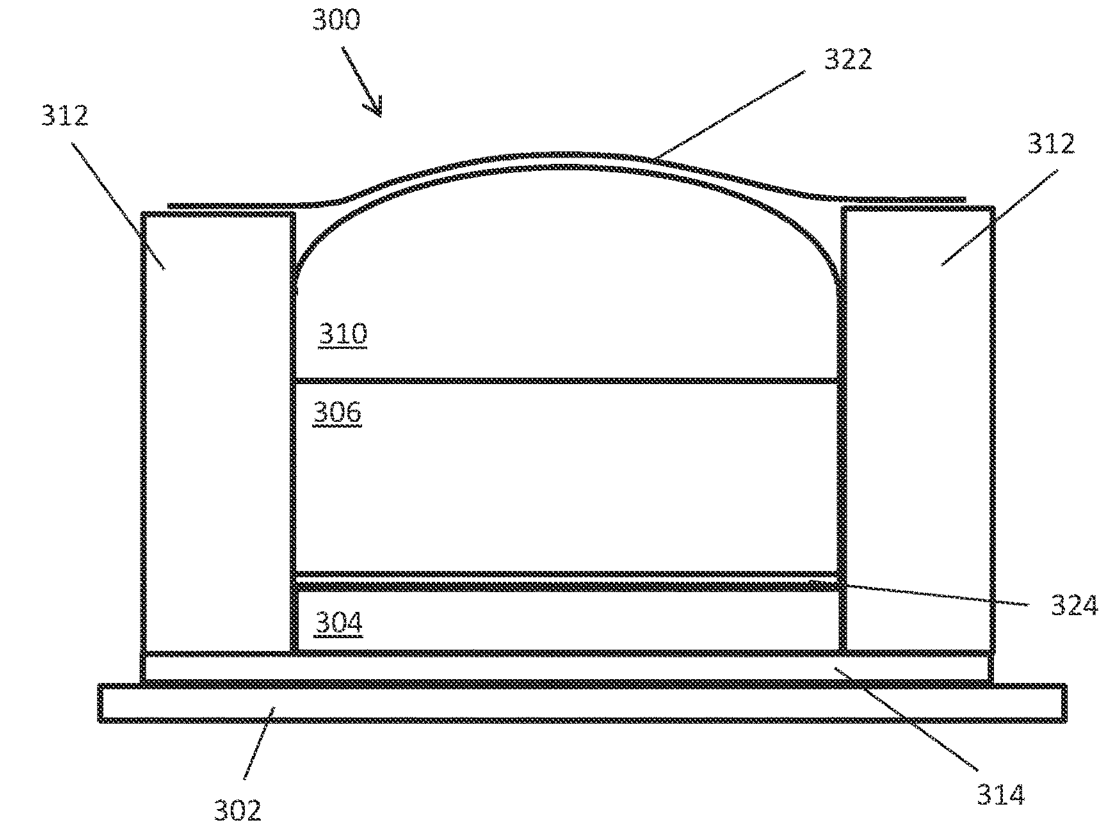
FIG. 3 is a schematic view of a third transducer.

FIG. 3 shows a schematic overview of a further example of a transducer 300. The transducer 300 includes a piezoelectric element 304, an compression element 306, a load transmitter 310 all located within a housing 312. The transducer 300 is located on a target 302 via a cover plate 314 in the form of a shim. The shim is not attached to the housing 312 in this instance but retained via pressure exerted between the housing 312 and the target 302. The components of transducer 300 can be considered to be largely similar to the ones described in the previous examples and will not be described in detail here.

The transducer 300 further comprises a compression mechanism 322 which contacts the load transmitter 310 and urges it forwards onto the compression element 306 to provide a compressive load. This in turn urges the compression element 306 into the piezoelectric element 304 which is in turn driven into the cover plate 314. In the situation where the cover plate is rigid enough, the compression on of the compression element may be achieved between the cover plate and compression mechanism. However, where the cover plate is a soft metallic sheet, e.g. a foil, for example, the compression may on be achieved when the housing is attached to the target and the compression member can drive the compression element and piezoelectric element against the target surface.

The compression mechanism 322 may be provided by a resiliently deformable member which extends across the rearward face of the load transmitter 310 towards a distal end of the housing 312. The resiliently deformable member may be a diaphragm or strip of suitable material which extends across the rearward opening in the end of the housing 312.

The resiliently deformable member may be fixed to the housing 312 on opposing sides of the load transmitter 310. The fixings can be any suitable type, such as welds or bolts for example, and act to anchor the periphery or end portions of the compression mechanism 322. Thus, the compression mechanism 322 may be anchored at the extremities and comprise a mid-portion located against the load transmitter 310. The compression mechanism 322 may be stressed during assembly to provide a bias which urges the load transmitter 310 forwards.

It will be appreciated that although the compression member 322 shown in FIG. 3 spans the housing 310 between first and second ends which are attached to the housing, it is possible that the compression mechanism 322 is provided by a cantilever structure which extends from and is attached at one end only.

The compression mechanism 322 may be formed from a diaphragm or cap which is attached at its periphery to the housing to seal the housing 312 at the distal end thereof.

The load on the compression element 306 is required to provide mechanical damping to what is a low acoustic impedance material. The level of load will be determined by the various materials used in the transducer, dimensions of the parts and the contact surface with the target. For example, a large area piezoelectric element/compression element, for example, >10 mm diameter, will require a larger compressive force in order to provide the same mechanical damping. Further, where the contact surface between the target and piezoelectric element is a line contact, for example, due to the target being curved as would be the case for a pipe, the force may be lower than that required for a flat surface having a larger contacting area. Taking these considerations into account, a typical force applied by the compression mechanism is likely to be between approximately 2 kN and 0.1 kN. Preferably, the load may be in excess of 0.5 kN. The load may be less than 1.5 kN. In one example, a 1 kN load was applied to a 10 mm diameter compression element made from the ceramic material described below and was found to have good acoustic absorbing properties. The applied pressure may be between 2.5 MPa and 500 MPa. In many examples, the pressure will be between 20 MPa and 30 MPa or between 10 MPa and 40 MPa.

Providing the compressive force through the compression element and piezoelectric element onto the target can help the coupling between the piezoelectric element and target. If the force is large enough and the acoustic impedance of the compression element lower enough relative to the piezoelectric element, the ultrasonic propagation can be directed more or else exclusively forwards with very little entering the backing material (i.e. compression element). This is particularly so when the backing material is acoustically opaque.

Generally, the housing 312 (and the other housings described herein) may be fixed to the target 302 using a suitable arrangement of attachments. Such an arrangement may comprise a clamp. The clamp may be a band clamp which wraps around the target 302 and transducer 300 prior to being tensioned in order to force the transducer 300 onto the target 302. This may be particularly suitable when the target 302 is a round body such as a pipe for example.

Alternatively, the transducer 300 may be mounted via one or more fixings which engage with the target 302. Such fixings may include a bolted arrangement in which one or more bolts are passed through a flange provided on the base of the housing 312 and received in suitable corresponding threaded apertures in the target 302. Other examples of conventional fixing, such as welding, will be apparent to the skilled person.

In the example of a threaded fixing such as a bolted arrangement, the housing 312 may be attached to the target and then driven towards it when the fixings (or clamp for example) are tightened. In doing so, it is possible for the compression mechanism 322 to be loaded/biased as the housing is screwed down. To achieve this, the constituent parts may have an uncompressed stacked depth which is greater than the housing depth such that they are proud of the proximal surface of the housing which abuts the target in use. Upon mounting, the piezoelectric element and/or cover plate and/or intermediate layer contact the target before the housing and push back against the compression mechanism, thereby loading and priming it, as the housing is fixed down.

The relative dimensions of the housing and internal parts of the transducer (e.g. the compression element, load transmitter and piezoelectric element) can be predetermined to provide the necessary deflection of the compression mechanism for a predetermined amount of compressive force.

In some examples, the compression mechanism may be a threaded device which can be screwed down on top of the compression element/load transmitter. However, this may be prone to vibration induced movement in service.

In some examples, the resiliently deformable member and/or compression mechanism more generally may be arranged to be temperature and/or pressure responsive. Thus, for example, if the temperature of the transducer and/or target changes during operation, the compression mechanism 322 may be arranged to exert more or less pressure on the load transmitter 310 as required to maintain the necessary contact pressure on the compression element 306 and at the interfaces of adjacent parts. The responsive behaviour of the compression mechanism 322 may be achieved via the selection of materials used for the various parts of the transducer 300 such that the differential thermal expansion experienced between the housing 312 and internal parts can be at least partially accounted for by the active thermal response of the compression mechanism 322. The temperature responsiveness may be such that a pressure applied to the piezoelectric element may be kept within a predetermined desirable range. The range of pressure may be calculated or arrived empirically. The variance in temperature and pressure may be accounted for in the subsequent signal processing.

The load transmitter 310 can be any suitable device and construction to enable the load from the compression mechanism 322 to be transferred to the compression element 306 to provide the necessary compressive force. As shown in FIG. 3, the load transmitter 310 may have a planar proximal surface to provide a uniform surface for the interface with the compression element 306. The rearward surface of the load transmitter may include one or more location features which can engage with the compression mechanism 322. In the example shown, the rearward surface of the load transmitter 310 comprises rounded or domed profile. The domed profile may assist in locating the load transmitter 310 against the compression mechanism 322, and/or providing a greater surface contact with the compression mechanism 322 when it is in a biased state. This helps distribute the load across the contacting surface of the load transmitter 310.

The dome may extend from a base to an apex. The apex may be located centrally. The base of the dome may be coterminous with the side wall(s) of the load transmitter 310. The base may be within or proud of the rearward surface of the housing 312. The domed profiled may be rounded in two dimensions as shown in FIG. 3, or three dimensions so as to be a true dome, such as a hemispherical dome.

It will be appreciated that the piezoelectric elements of the various examples will require an electrical connection in order to receive and output the various required electrical signals. Piezoelectric elements of the type described herein typically have a suitable metallic layer deposited on the end faces of the piezo material by a suitable deposition technique. These are then connected to external conductors which provide the required input and output signals from the associated devices.

An example of an electrode 324 is shown in FIG. 3 on the rearward surface of the piezoelectric element 304. The electrode 324 is attached directly to and forms part of the piezoelectric element 304 as is commonly known in the art. The external conductor which provides the electrical communication to the exterior of the device is not shown. The front face 304*a* of the piezoelectric element 304 is urged into contact with the cover plate 314 which provides an electrical connection to the housing 312.

Figure 4:
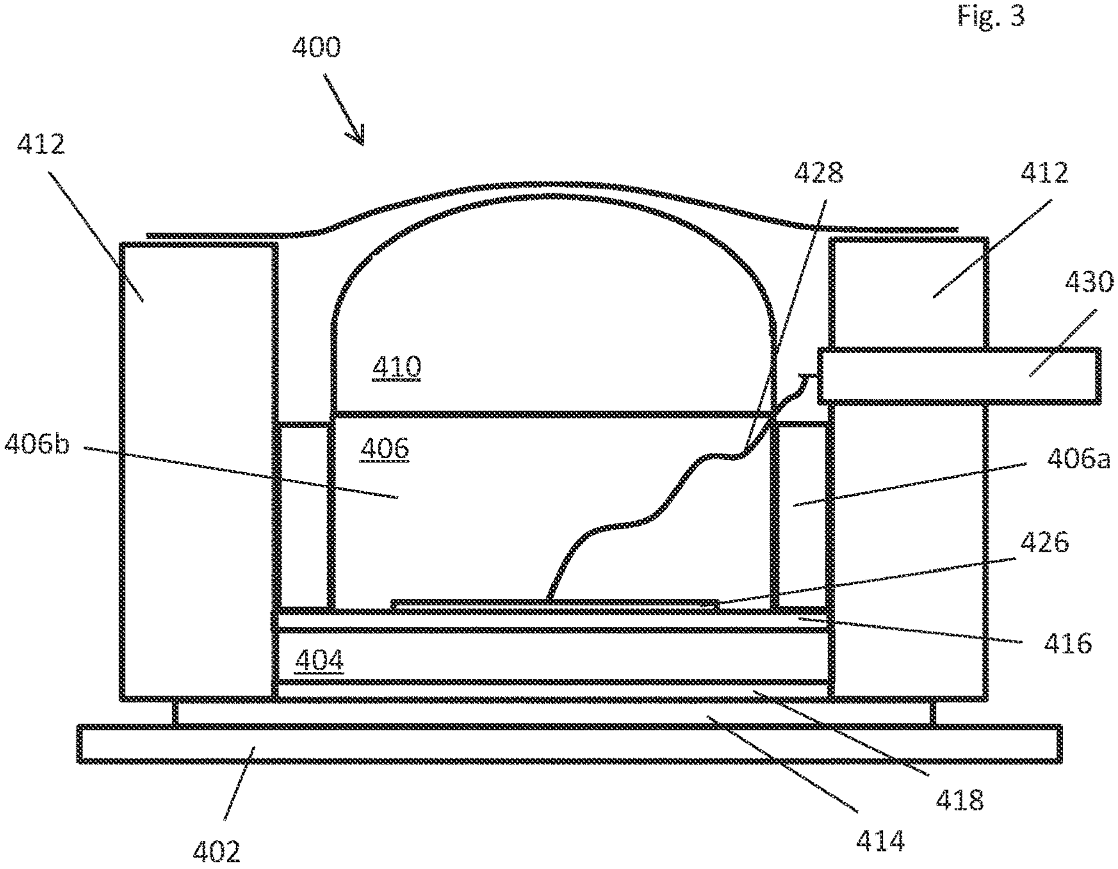
FIG. 4 is a schematic view of a fourth transducer.

FIG. 4 shows yet a further example of a transducer 400. The transducer 400 is similar to the transducer 300 shown in FIG. 3 and has corresponding parts with reference numerals incremented by 100.

The example of FIG. 4 comprises a two part compression element 406. The compression element 406 includes an outer part 406*a* and an inner part 406*b* which are concentrically nested within each other. Thus, the outer part 406*b* may be thought of as an annular sleeve which surrounds the inner part 406*a*. The inner and outer parts 406*a,b* may be fabricated separately and assembled during the assembly of the transducer 400, or may form a sub-assembly prior to the compression element 406 being loaded into the housing 412. The sub-assembly may comprise the inner and outer parts joined together to provide a homogenous single structure.

The outer part 406*b* may be received within the internal cavity of the housing 412 with an outer dimension which corresponds to the internal dimensions of the cavity to limit lateral movement. In doing so, there is provided a location feature into which the inner part 406*b* may be slidably received. The outer and inner part 406*a,b*, may be made from the same material, or may be made from a different material.

The contacting surface of the load transmitter may correspond to the inner part of the compression element only. Thus, the load and resultant compression may be provided to the inner part 406*b* alone.

Intermediate layers 416 and 418 are similar to those described in connection with FIG. 2 are provided on either side of the piezoelectric element 404 and may or may not include the conforming surface features. The intermediate layers may be conductive. In particular, the intermediate layers may be metallic sheets or foils which are in electrical communication with either side of the piezoelectric element 406 and provide improved contact between the adjacent parts.

A contacting electrode 426 is provided on the distal contacting surface of the compression element 406. The contacting electrode 426 provides an electrically conductive interface for contacting with the electrode of the piezoelectric element 404, the connection potentially being provided via the described conductive intermediate layer.

To prevent a discontinuity in the load applied across a surface of the piezoelectric element, the contacting electrode may be flush on the contacting surface of the compression element 406 so as to provide a planar interface for appropriate contact. It will be appreciated that the use of a conformable intermediate layer 416 as described above may help to account for any inadvertent unevenness in the surface.

The contacting electrode 426 may be formed within the compression element when it cast or otherwise manufactured. When the compression element is cast, for example, as a ceramic, the contacting surface of the compression element can be ground back to reveal the contacting electrode 426 and provide the planar contacting surface.

The rear surface of the contacting electrode 426 is connected to a connecting conductor 428 which extends between the contacting electrode 426 and an external cable 430. The external cable 430 may be received within a suitable aperture in the side wall of the housing 412 and be held in place using a suitable termination. For example, the external cable may be terminated using a gland which is threadably received within the aperture as is well known in the art.

The external cable 430 may include two or more conductors. One of the conductors may be in electrical communication with the connecting conductor 428, the other with another electrode of the piezoelectric element 404. The example shown in FIG. 4 provides an electrical connection between a conductive sheath of the cable and the housing, which in turn is in electrical communication with the front face of the piezoelectric element 404 via the cover plate 414 and intermediate layer 418.

The connection between the connecting cable 428 and the central conductor of the external cable 430 is provided by the joint within a cavity internal to the housing. The joint may be achieved by any suitable means as known in the art.

Although not shown in FIG. 4, the load transmitter 410 may be located within a removable socket which is snugly received within the distal portion of the housing 412. The removable socket may have a cavity into which the load transmitter 410 can be received. The cavity in which the termination between the connecting cable and external is located may be at least partially defined by the removable socket and an internal wall of the housing 412.

It will be appreciated that the external cable 430 can be used to input and/or output electrical signals from the transducer for analysis by a suitable signal processing system as is well known in the art. For example, the inner conductor which connects to the rearward side of the piezoelectric element 404, may be a signal line, with the sheath and housing providing a ground connection.

The transducer 400 may form part of a fixed assembly which is attached to the target 402, or may be part of a temporary transducer arrangement which can be moved between locations. The transducer may be part of a hand held device which can be used to probe different locations of a target, and/or different targets.

The individual components of the transducers described herein may be fabricated from any suitable materials as known in the art. In one example, the housings and compression mechanisms may be fabricated from stainless steel. As described above, the piezoelectric elements may be any suitable piezoelectric material. The piezoelectric material may have piezoelectric charge coefficient, d33, of less than 20 pC/N. In one example, the piezoelectric material may be a Bismuth Titanate or a modified Bismuth Titanate. One example is PZ46 provided by Meggitt™.

As noted above, the compression elements typically have a low acoustic impendence which is generally below 20 Mrayls. Conventional acoustic absorbers typically have an acoustic impedance substantially the same as that of the piezoelectric material, which helps energy moving rearwards from the target direction to be absorbed more readily. Typical acoustic absorbers will have acoustic impedances of around 25-30 Mrayls in order to achieve a high efficiency transfer of acoustic energy from the piezoelectric material into the acoustic absorber. Consequentially, the acoustic absorbers are generally designed to scatter this energy and often comprise a composite made of two materials. Thus, an acoustic material may be a mixture of tungsten or other heavy metal with a castable epoxy, ceramic and or glass. The conventional acoustic absorber may include one or more of mullite, cordierite, alumina-silicate, ceramic, and have internal porosity.

The compression element of the examples described herein may be formed from a non-composite material. The material may be homogeneous. The material may be a castable ceramic. The castable ceramic may be a ceramic adhesive. The inner part and outer part of the acoustic absorber described in relation to FIG. 4 may be made from the same or different materials.

The transducer may be used in high temperature applications in which a ceramic material is well suited. The compression element may additionally have a high compressive strength and be ultrasonically opaque. The compression element composition may be a zirconia based castable ceramic. The ceramic may include alkali fluorosilicates and may include calcium silicates. Where included, alkali fluorosilicates and calcium silicates may be approximately between 2.5-10%. The material may further include aluminium silicates in the range of approximately 1-2.5%. The ceramic may be porous to improve the ultrasonic opacity. The compression element may comprise a refractory cement.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A piezoelectric transducer which is mounted to a target in use, comprising:

a piezoelectric element having a front face which faces the target, and an opposing rear face which faces away from the target, wherein the piezoelectric element has a first acoustic impedance;

a compression element located on the rear face of the piezoelectric element, the compression element having a second acoustic impedance which is less than the first acoustic impedance, the compression element having a contacting surface in electrical communication with the rear face of the piezoelectric element, wherein the compression element includes at least one of:

an electrical contact on the contacting surface of the compression element, the electrical contact being flush with the contacting surface and providing the electrical communication with the rear face of the piezoelectric element; or an electrical connection extending from the contacting surface of the compression element to an interface connection which is rearwards of the piezoelectric element; and a compression mechanism which urges the compression element towards the piezoelectric element such that the compression element is compressed between the compression mechanism and piezoelectric element, wherein the compression provided by the compression mechanism is of such a level to mechanically dampen the piezoelectric element.

2. A piezoelectric transducer as claimed in claim 1, wherein the second acoustic impedance is less than 20 Mrayls.

3. A piezoelectric transducer as claimed in claim 2, wherein the second acoustic impedance is greater than 1 Mrayls.

4. A piezoelectric transducer as claimed in claim 1, wherein the second acoustic impedance is less than 5.5 Mrayls.

5. A piezoelectric transducer as claimed in claim 1, further comprising a load transmitter through which load is transmitted from the compression mechanism to the compression element.

6. A piezoelectric transducer as claimed in claim 5, wherein the load transmitter includes a rearward outer surface comprising a rounded surface for engaging with the compression mechanism.

7. A piezoelectric transducer as claimed in claim 1, wherein the compression mechanism comprises a clamp which is attachable to the target and arranged to clamp the piezoelectric transducer to the target via the compression element and piezoelectric element.

8. A piezoelectric transducer as claimed in claim 1, wherein the compression mechanism comprises a resilient bias which urges the compression element forwards.

9. A piezoelectric transducer as claimed in claim 8, wherein the resilient bias is a spring element which extends across a rear surface of a housing and contacts a load transmitter or the compression element, wherein the housing houses the compression element and piezoelectric element.

10. A piezoelectric transducer as claimed in claim 1, wherein the compression mechanism applies a force of at least 0.5 kN to the compression element.

11. A piezoelectric transducer as claimed in claim 10, wherein the compression mechanism applies a force of at least 1 kN to the compression element.

12. A piezoelectric transducer as claimed in claim 1, wherein the compression mechanism is temperature responsive such that the compressive force or pressure on the piezoelectric element remains within a predetermined range independent of temperature.

13. A piezoelectric transducer as claimed in claim 1, further comprising the target.

14. A piezoelectric transducer as claimed in claim 13, wherein the target is at a temperature of greater than 200 degrees Celsius.

15. A piezoelectric transducer as claimed in claim 1, wherein the compression element and piezoelectric element are freely coupled together and held together by the compressive force of the compression mechanism.

16. A piezoelectric transducer as claimed in claim 1, wherein the compression element is a two part structure.

17. A piezoelectric transducer as claimed in claim 1, further comprising one or more intermediate layers between the piezoelectric element and target.

18. A piezoelectric transducer as claimed in claim 17, wherein one of the intermediate layers is a cover plate which is attached to a housing at a target end thereof, wherein the housing houses the compression element and piezoelectric element.

19. A piezoelectric transducer as claimed in claim 17, wherein at least one of the intermediate layers is a metallic sheet arranged to conform to the surface of the target.

20. A piezoelectric transducer as claimed in claim 1, wherein the compression element and piezoelectric element are held together only by the compressive force of the compression mechanism.

21. A piezoelectric transducer as claimed in claim 1, wherein the compression element is acoustically opaque.

22. A system comprising: a target; the piezoelectric transducer of claim 1; and, signal processing equipment arranged to receive and analyse an electrical signal produced by the piezoelectric transducer.

* * * * *